United States Patent
Nahata et al.

(10) Patent No.: US 10,472,534 B2
(45) Date of Patent: Nov. 12, 2019

(54) LAYERED PRODUCT AND METHOD FOR MANUFACTURING THE SAME

(71) Applicants: TOYO INK SC HOLDINGS CO., LTD., Tokyo (JP); TOYOCOLOR CO., LTD., Tokyo (JP)

(72) Inventors: Nobuyuki Nahata, Tokyo (JP); Katsumi Watanabe, Tokyo (JP); Yu Morita, Tokyo (JP); Motoki Masuda, Tokyo (JP); Toshiaki Hirayama, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 81 days.

(21) Appl. No.: 15/327,340

(22) PCT Filed: Jul. 2, 2015

(86) PCT No.: PCT/JP2015/003331
§ 371 (c)(1),
(2) Date: Jan. 18, 2017

(87) PCT Pub. No.: WO2016/013162
PCT Pub. Date: Jan. 28, 2016

(65) Prior Publication Data
US 2017/0166769 A1 Jun. 15, 2017

(30) Foreign Application Priority Data
Jul. 22, 2014 (JP) .................. 2014-148454

(51) Int. Cl.
| | | |
|---|---|---|
| C09D 17/00 | (2006.01) | |
| B05D 5/06 | (2006.01) | |
| C09C 1/44 | (2006.01) | |
| C09D 163/00 | (2006.01) | |
| C09D 133/00 | (2006.01) | |
| C09D 153/00 | (2006.01) | |
| C09D 175/04 | (2006.01) | |
| B05D 7/24 | (2006.01) | |
| C09C 1/48 | (2006.01) | |
| B32B 7/02 | (2019.01) | |
| B32B 27/20 | (2006.01) | |
| C08J 7/04 | (2006.01) | |
| B82Y 30/00 | (2011.01) | |
| B82Y 40/00 | (2011.01) | |
| C08K 3/04 | (2006.01) | |
| C08K 7/24 | (2006.01) | |
| C01B 32/05 | (2017.01) | |

(52) U.S. Cl.
CPC ........... *C09D 17/004* (2013.01); *B05D 5/061* (2013.01); *B05D 7/24* (2013.01); *B32B 7/02* (2013.01); *B32B 27/20* (2013.01); *C08J 7/047* (2013.01); *C09C 1/44* (2013.01); *C09C 1/48* (2013.01); *C09D 17/005* (2013.01); *C09D 133/00* (2013.01); *C09D 153/00* (2013.01); *C09D 163/00* (2013.01); *C09D 175/04* (2013.01); *B82Y 30/00* (2013.01); *B82Y 40/00* (2013.01); *C01B 32/05* (2017.08); *C08K 3/04* (2013.01); *C08K 7/24* (2013.01); *C08K 2201/011* (2013.01); *Y10S 977/742* (2013.01); *Y10S 977/753* (2013.01); *Y10S 977/892* (2013.01)

(58) Field of Classification Search
None
See application file for complete search history.

(56) References Cited

U.S. PATENT DOCUMENTS

| | | | |
|---|---|---|---|
| 2005/0170158 A1* | 8/2005 | Hattori | .................. B32B 7/00 428/212 |
| 2008/0029292 A1* | 2/2008 | Takayama | ............... G06F 3/045 174/126.4 |
| 2013/0221284 A1 | 8/2013 | Hagiwara et al. | |

FOREIGN PATENT DOCUMENTS

| | | |
|---|---|---|
| EP | 3 159 162 | 4/2017 |
| JP | H6-15223 | 1/1994 |
| JP | 2001-179176 | 7/2001 |
| JP | 2004-098033 | 4/2004 |
| JP | 2011-201961 | 10/2011 |
| JP | 2012-112088 | 6/2012 |
| JP | 2013-209494 | 10/2013 |

OTHER PUBLICATIONS

Extended European Search Report issued in European Patent Application No. EP 15 82 4130 dated Feb. 14, 2018.
Notification for Reasons for Refusal issued in corresponding Japanese Patent Application No. 2014-148454, dated Feb. 3, 2016.

* cited by examiner

*Primary Examiner* — Jeffrey D Washville
(74) *Attorney, Agent, or Firm* — Seyfarth Shaw LLP (57) ABSTRACT

Provided is a layered product with high jet-black. A layered product according to the present invention is a layered product (10) including at least a first layer (1) and a second layer (2) that are stacked. A value of L* in a L*a*b* color system defined by JIS Z8729 of the first layer (1) is ten or less. The second layer (2) is formed on the first layer (1) and 0.1 to 1 mass % of carbon nanotubes are contained in a material constituting the second layer (2). In the L*a*b* color system defined by JIS Z8729, when values are measured from a side of a plane of the second layer (2), a value of L* is 2.5 or less, a value of a* is −2.0 or greater and 2.0 or less, and a value of b* is −2.0 or greater and 0.5 or less.

13 Claims, 1 Drawing Sheet

LAYERED PRODUCT AND METHOD FOR MANUFACTURING THE SAME

CROSS REFERENCE TO RELATED APPLICATIONS

This application is a U.S. National Stage application of PCT International Patent Application Number PCT/JP2015/003331, which was filed on Jul. 2, 2015, which claims priority to Japanese Patent Application No. 2014-148454, which was filed on Jul. 22, 2014, the disclosures of each of which is incorporated herein by reference in its entirety.

TECHNICAL FIELD

The present invention relates to a layered product and a method of manufacturing the same. More specifically, the present invention relates to a layered product including a layer containing carbon nanotubes and a method of manufacturing the same.

BACKGROUND ART

It has been desired by product designers and consumers to provide sophisticated design in resin moldings. In particular, so-called jet-black resin moldings that have a bluish tint and high blackness have been desired in order to provide rich impression and high-grade texture. For example, for coatings of automobiles and the like, there has been an increasing demand to improve appearance (coating texture) that appeal to aesthetic sense not only for the purpose of protecting auto bodies and improving durability. It is necessary to improve depth, transparency, and perspective feeling in color in order to improve the coating texture. Black coatings that have feelings of jet-black and depth are strongly desired as coatings providing a rich impression.

In the techniques disclosed by Patent Literature 1 and 2, carbon black is uniformly dispersed in a resin solution or a solid resin in order to obtain jet-black resin coated products, films, and moldings. However, with the above means disclosed in Patent Literature 1 and 2, a brightness (L*) is high (gray/white), and the chromaticity (a* and b*) has positive values (+a*: red and +b*:yellow). It has thus been difficult to express jet-black such as so-called "piano black" and "lusterous black of the crow".

A color tone of a molding that uses carbon black tends to vary according to a primary particle size of the compounded carbon black. To be more specific, when carbon black with a small primary particle size is used, a color tone with blackness and an intense red color tint can be obtained. On the contrary, when carbon black with a large primary particle size is used, a color tone that has a bluish tint and reduced blackness is obtained. As described above, in a color tone of black using carbon black, blackness and a bluish tint are in a trade-off relation. Thus, it has been difficult to reproduce a jet-black color tone that has a bluish tint and high blackness.

Patent Literature 3 suggests a coating film structure that is obtained by forming a black base color layer having a brightness of less than 0.2 and a black color clear layer containing carbon black of more than 0.1 mass % and 10 mass % or less. Patent Literature 4 discloses a resin composition containing carbon nanotube fibers in a dispersion medium as a coating composition and a black coating film that is obtained by applying and drying the coating composition, so that the black coating film contains 4.5 pts·mass of carbon nanotube fibers.

However, there has been a problem in the conventional coating film structure that it is difficult to exhibit sufficient jet-black and achieve a low brightness.

CITATION LIST

Patent Literature

Patent Literature 1: Japanese Unexamined Patent Application Publication No. 2001-179176
Patent Literature 2: Japanese Unexamined Patent Application Publication No. 2004-098033
Patent Literature 3: Japanese Unexamined Patent Application Publication No. H6-15223
Patent Literature 4: Japanese Unexamined Patent Application Publication No. 2012-112088

SUMMARY OF INVENTION

Technical Problem

The present invention has been made in light of the above problem and an object of the present invention is to provide a layered product with high jet-black and a method of manufacturing the same.

Solution to Problem

As a result of intensive investigations, the present inventors have found the following embodiments could solve the above problem and thus achieved the present invention.
[1]: A layered product comprising at least two layers, a first layer and a second layer, wherein a value of $L^*$ in a $L^*a^*b^*$ color system defined by JIS Z8729 of the first layer is ten or less, the second layer is formed on the first layer and 0.1 to 1 mass % of carbon nanotubes are contained in a material constituting the second layer, and in the $L^*a^*b^*$ color system defined by JIS Z8729, a value of $L^*$ of is 2.5 or less, a value of $a^*$ of is −2.0 or greater and 2.0 or less, and a value of $b^*$ of is −2.0 or greater and 0.5 or less, when the values are measured from a side of a plane of the second layer.
[2] The layered product according to [1], wherein an average transmittance of the second layer at a wavelength within a range of 380 to 780 nm is 5% or greater and 800% or less.
[3] The layered product according to [1] or [2], wherein the second layer is formed by wet coating.
[4] The layered product according to any one of [1] to [3], wherein a film thickness of the first layer is 0.5 μm or greater and 20 μm or less.
[5] The layered product according to any one of [1] to [4], wherein a film thickness of the second layer is 0.5 μm or greater and 20 μm or less.
[6] The layered product according to any one of [1] to [5], wherein the first layer is formed by melting and kneading.
[7] The layered product according to any one of [1] to [6], wherein 1 to 20 mass % of carbon nanotubes are contained in a material constituting the first layer.
[8] A method of manufacturing a layered product comprising at least two layers, a first layer and a second layer, the method comprising: forming the first layer having a value of $L^*$ in a $L^*a^*b$ color system defined by JIS Z8729 of ten or less; and forming the second layer on the first layer by wet coating, wherein 0.1 to 1 mass % of carbon nanotubes are contained in the second layer, and a value of $L^*$ of is 2.5 or less, a value of $a^*$ of is −2.0 or greater and 2.0 or less, and a value of b* of is −2.0 or greater and 0.5 or less, when the values are measured from a side of a plane of the second layer.

Advantageous Effects of Invention

According to the present invention, it is possible to achieve a layered product with high jet-black and a method of manufacturing the same.

DESCRIPTION OF EMBODIMENTS

Hereinafter, an exemplary embodiment of the present invention will be described in detail based on the drawing. In the following descriptions, the term "resin composition" indicates dispersions for forming a first layer and a second layer. The resin composition for forming the first layer will be referred to as a "resin composition for forming first layer (a')", and the resin composition for forming the second layer will be referred to as a "resin composition for forming second layer (b')". Further, the term "layer" indicates a molding formed of a resin composition.

(1) Resin Composition for Forming First Layer (a')

The resin composition for forming first layer (a') contains a black pigment and a resin playing a role in forming layers as essential components and may contain wax and a solvent as necessary. An additive(s) such as a dispersant and the like may be added to the resin composition for forming first layer (a') as necessary. Although there are no particular limitations on a method of making the resin composition for forming first layer (a'), it is preferable to perform a dispersion process using a paint shaper (manufactured by Red Devil Inc.), a ball mill, a sand mill (such as "Dyno-mill" manufactured by Shinmaru Enterprises Corporation), an attritor, a pearl mill (such as "DCP MILL" manufactured by Eirich GmbH), a CoBall-Mill, a basket mill, a homomixer, a homogenizer (such as "Clearmix" manufactured by M Technique Co., Ltd.), a wet jet mill (such as "Genus PY" manufactured by Genus PLC and "nanomizer" manufactured by Nanomizer, Inc.), a hoover muller, a triple roll mill, an extruder (twin screw extruder), a Henschel mixer, or the like.

Further, a high-speed stirrer may be used to obtain the resin composition for forming first layer (a'). Examples of the high-speed stirrer include Homogenizing Disper (manufactured by Primix Corporation), Filmix (manufactured by Primix Corporation), Dissolver (manufactured by Inoue MFG. Inc.), and Hyper HS (manufactured by Ashizawa Finetech Ltd.).

As the dispersant, a surfactant or a resin-type dispersant may be used. The surfactant is mainly categorized as anionic, cationic, nonionic, and amphoteric surfactants. A preferred type and blend amounts of these surfactants can be selected and used according to required properties. The dispersant is preferably a resin-type dispersant. Although there are no particular limitations on the dispersants, preferred examples of the dispersants are the following compounds.

Examples of the anionic surfactant include fatty acids salts, polysulfonic salts, polycarboxylic acid salts, alkyl sulfate salts, alkyl aryl sulfonic acid salts, alkyl naphthalene sulfonic acid salts, dialkyl sulfonic acid salts, dialkyl sulfosuccinic acid salts, alkyl phosphoric acid salts, polyoxyethylene alkyl ether sulfonic acid salts, polyoxyethylene alkyl aryl ether sulfonic acid salts, naphthalene sulfonic acid-formalin condensates, polyoxyethylene alkyl phosphoric acid sulfonic acid salts, glycerol borate fatty acid esters, polyoxyethylene glycerol fatty acid esters. Specific examples include sodium dodecylbenzene sulfonate, sodium laurate sulfate, sodium polyoxyethylene lauryl ether sulfate, polyoxyethylene nonylphenyl ether sulfate salts, and the sodium salt of β-naphthalenesulfonic acid-formalin condensate.

Examples of the cationic surfactant include alkyl amine salts and quaternary ammonium salts. Specific examples include stearyl amine acetate, trimethyl palm ammonium chloride, trimethyl tallow ammonium chloride, dimethyldioleylammonium chloride, methyl oleyl diethanol chloride, tetramethylammonium chloride, laurylpyridinium chloride, laurylpyridinium bromide, laurylpyridinium disulfate, cetylpyridinium bromide, 4-alkylmercaptopyridine, poly(vinylpyridine)-dodecyl bromide, and dodecylbenzyl triethyl ammonium chloride. Examples of the amphoteric surfactant include aminocarboxylate and so on.

Examples of the nonionic surfactant include polyoxyethylene alkyl ether, polyoxyalkylene derivatives, polyoxyethylene phenyl ether, sorbitan fatty acid ester, polyoxyethylene sorbitan fatty acid ester, and alkyl allyl ether. Specific examples include polyoxyethylene lauryl ether, sorbitan fatty acid ester, and polyoxyethylene octyl phenyl ether.

When selecting the surfactant, the surfactant need not be limited to a single surfactant, and combinations of two or more surfactants may also be used, including a combination of an anionic surfactant and a nonionic surfactant, or a combination of a cationic surfactant and a nonionic surfactant. In the case of such combinations, the blend amounts described above are preferably applied to each of the surfactant components. A combination of an anionic surfactant and a nonionic surfactant is preferable. As the anionic surfactant, polycarboxylate is preferable, and as the nonionic surfactant, polyoxyethylene phenyl ethers are preferable.

Examples of the resin-type dispersant include polyurethanes; polycarboxylic acid esters such as polyacrylates; unsaturated polyamides, polycarboxylic acids, (partial) amine salts of polycarboxylic acids, ammonium salts of polycarboxylic acids, alkyl amine salts of polycarboxylic acids, polysiloxanes, long-chain polyaminoamide phosphates, hydroxyl group-containing polycarboxylic acid esters, and modified products of these compounds; oil-based dispersants such as amides formed by a reaction between a poly(lower alkyleneimine) and a polyester having free carboxyl groups, and salts thereof; water-soluble resins and water-soluble polymer compounds such as (meth)acrylic acid-styrene copolymers, (meth)acrylic acid-(meth)acrylate ester copolymers, styrene-maleic acid copolymers, polyvinyl alcohol and polyvinylpyrrolidone; and polyester-based resins, modified polyacrylate-based resins, ethylene oxide/propylene oxide adducts and phosphate ester-based resins. These resin-type dispersants may be used individually, or in mixtures containing two or more dispersants. Note that the term (meth)acrylic acids indicate acrylic acid and methacrylic acid.

Among the above resin-type dispersants, a resin-type dispersant having acidic functional groups such as a polycarboxylic acid is preferable, because it enables the viscosity of the dispersed composition to be lowered by adding a small amount of the dispersant, and also exhibits a high level of spectral transmittance. The resin-type dispersant plays an auxiliary role. The content of the resin-type dispersant to carbon nanotubes is preferably within a range of about 3 to 300 mass %, and more preferably within a range of about 5 to 100 mass % in terms of film forming property.

Specific examples of commercially available resin-type dispersants include: Disperbyk products manufactured by BYK Chemie GmbH, including Disperbyk-101, 103, 107, 108, 110, 111, 116, 130, 140, 154, 161, 162, 163, 164, 165, 166, 170, 171, 174, 180, 181, 182, 183, 184, 185, 190, 2000, 2001, 2020, 2025, 2050, 2070, 2095, 2150, and 2155 or Anti-Terra-U, 203, and 204, or BYK-P104, P104S, 220S, and 6919, or Lactimon, Lactimon-WS, or Bykumen etc.; Solsperse series manufactured by Lubrizol Japan Ltd., including Solsperse-3000, 9000, 13000, 13240, 13650, 13940, 16000, 17000, 18000, 20000, 21000, 24000, 26000, 27000, 28000, 31845, 32000, 32500, 32550, 33500, 32600, 34750, 35100, 36600, 38500, 41000, 41090, 53095, 55000 and 76500, etc.; EFKA series manufactured by BASF Corporation, including EFKA-46, 47, 48, 452, 4008, 4009, 4010, 4015, 4020, 4047, 4050, 4055, 4060, 4080, 4400, 4401, 4402, 4403, 4406, 4408, 4300, 4310, 4320, 4330, 4340, 450, 451, 453, 4540, 4550, 4560, 4800, 5010, 5065, 5066, 5070, 7500, 7554, 1101, 120, 150, 1501, 1502 and 1503, etc.; and Ajisper PA111, PB711, PB821, PB822 and PB824 etc. manufactured by Ajinomoto Fine-Techno Co., Inc.

A resin(s) that is an essential component of the resin composition for forming first layer (a') may be one of a natural resin and a synthetic resin or a combination of two or more types of the natural resin and the synthetic resin. Although there are no particular limitations on the resins, preferable examples of the resins are shown below.

Examples of the natural resin include natural rubber, gelatin, rosin, shellac, polysaccharide, gilsonite. Examples of the synthetic resin include a phenolic resin, an alkyd resin, a petroleum resin, a vinyl-based resin, an olefin resin, synthetic rubber, polyester, a polyamide resin, an acrylic resin, a styrene resin, an epoxy resin, a melamine resin, an urethane resin, an amino resin, an amide resin, an imide resin, a fluororesin, a vinylidene fluoride resin, a vinyl chloride resin, an ABS resin, polycarbonate, a silicone resin, nitrocellulose, a rosin-modified phenol resin, and a rosin-modified polyamide resin. The resin of the resin composition for forming first layer (a') preferably contains an acrylic resin and/or a polyester resin in terms of light resistance.

A preferred example of the resin of the resin for forming first layer (a') is a two-pack clear coating (e.g., two-pack curable urethane coating) that uses a polyol resin containing a hydroxyl group as a main resin and isocyanate as a curing agent in terms of excellent weatherability of an obtained coating film. There are no particular limitations on the polyol resin used as a main resin. Examples of the polyol resin include polyester polyol, polyether polyol, acrylic polyol, polycarbonate polyol, and polyurethane polyol.

Examples of the isocyanate used as the curing agent include phenylene diisocyanate, tolylene diisocyanate, xylylene diisocyanate, bisphenylene diisocyanate, naphthylene diisocyanate, diphenylmethane diisocyanate, isophorone diisocyanate, cyclopentylene diisocyanate, cyclohexylene diisocyanate, methylcyclohexylene diisocyanate, dicyclohexylmethane diisocyanate, trimethylene diisocyanate, tetramethylene diisocyanate, pentamethylene diisocyanate, hexamethylene diisocyanate, propylene diisocyanate, ethylethylene diisocyanate, and trimethylhexamethylene diisocyanate.

When an emulsion coating is used as the resin composition for forming first layer (a'), a water-soluble resin is used as the resin. A preferable water-soluble resin is the one with an acid value within a range of 20 to 70 mg KOH/g and a hydroxyl value is within a range of 20 to 160 mg KOH/g. To be more specific, A polyester resin, an acrylic resin, and a polyurethane resin are especially preferable. The polyester resin preferably used as the water-soluble resin is a water-soluble resin having an acid value within a range of 20 to 70 mg KOH/g, preferably within a range of 25 to 60 mg KOH/g, especially preferably within a range of 30 to 55 mg KOH/g, and a hydroxyl value within a range of 20 to 160 mg KOH/g, preferably within a range of 80 to 130 mg KOH/g, that is obtained by using polyhydric alcohol and polybasic acid as resin materials.

Although there are no particular limitations on the resin material of the water-soluble polyester resin, it can be easily obtained by a known esterification reaction of polyhydric alcohol and polybasic acid, which constitute normal polyester acid, with fat and oil as necessary. Examples of the polyhydric alcohol include ethylene glycol, 1,2-propylene glycol, 1,3-propylene glycol, 1,3-butylene glycol, 1,4-butanediol, 1,6-hexanediol, diethylene glycol, dipropylene glycol, neopentyl glycol, triethylene glycol, hydrogenated bisphenol A, glycerin, trimethylol ethane, trimethylolpropane, pentaerythritol, and dipentaerythritol. As the polyhydric alcohol, one of the above compounds may be used or two or more compounds may be combined. Examples of the polybasic acid include phthalic anhydride, isophthalic acid, terephthalic acid, succinic anhydride, adipic acid, azelaic acid, sebacic acid, maleic anhydride, fumaric acid, itaconic acid, and trimellitic anhydride. As the polybasic acid, one of the above acids may be used or two or more acids may be combined. Examples of the fat and oil include soybean oil, coconut oil, safflower oil, rice bran oil, caster oil, tung oil, flaxseed oil, tall oil, and fatty acid obtained from these oils.

The acrylic acid preferably used as the water-soluble resin is a water-soluble resin that uses vinyl-based monomer as a resin material having an acid value within a range of 20 to 70 mg KOH/g, preferably within a range of 22 to 50 mg KOH/g, especially preferably within a range of 23 to 40 mg KOH/g, and a hydroxyl value within a range of 20 to 160 mg KOH/g, preferably within a range of 80 to 150 mg KOH/g.

The water-soluble acrylic acid can be easily obtained by using a vinyl-based monomer as a resin material constituting a normal acrylic resin by a known solution polymerization method or the like with organic peroxide as an initiator.

Examples of the vinyl-based monomer include: ethylenically unsaturated carboxylic acids such as acrylic acid, methacrylic acid, itaconic acid, maleic acid, fumaric acid, and crotonic acid; alkyl esters such as methyl, ethyl, propyl, isopropyl, isobutyl, tertiary butyl, 2-ethylhexyl, lauryl, cyclohexyl, stearyl, and the like of acrylic acid and methacrylic acid; hydroxyalkyl esters such as 2-hydroxyethyl, 2-hydroxypropyl, 3-hydroxypropyl, and polyethylene glycol having a molecular weight of 1000 or less of acrylic acid and methacrylic acid; amides of acrylic acid and methacrylic acid or their alkyl ethers such as acrylamide, methacrylamide, N-methylolacrylamide, diacetone acrylamide, diacetone methacrylamide, N-(methoxymethyl)acrylamide, N-(methoxymethyl)methacrylamide, and N-(butoxymethyl) acrylamide.

Further examples of the vinyl-based monomer include monomers containing glycidyl (meth)acrylate having epoxy group and tertiary amino groups such as N,N-dimethylaminoethyl (meth)acrylate and N,N-diethylaminoethyl (meth)acrylate. Other examples of the vinyl-based monomer include: aromatic monomers such as styrene, α-methylstyrene, vinyltoluene, and vinylpyridine; acrylonitrile, methacrylonitrile, vinyl acetate, and mono or dialkyl esters of maleic and fumaric acid.

Examples of the organic peroxide include acyl peroxides (e.g., benzoyl peroxide), alkyl hydroperoxides (e.g., t-butyl hydroperoxide, p-methan hydroperoxides), and dialkyl peroxides (e.g., di-t-butyl peroxide).

The polyurethane resin preferably used as the water-soluble resin is a water-soluble resin having an acid value within a range of 20 to 70 mg KOH/g, preferably within a range of 22 to 50 mg KOH/g, especially preferably within a range of 23 to 35 mg KOH/g, and a hydroxyl value within a range of 20 to 160 mg KOH/g, preferably within a range of 25 to 50 mg KOH/g, that is obtained by using polyol and polyisocyanate as materials.

The water-soluble polyurethane resin can be easily obtained by addition polymerization of polyol and polyisocyanate, which are resin materials that constitute a normal polyurethane resin.

Examples of the polyol include polyester polyol, polyether polyol, and acrylic polyol. Examples of the polyisocyanate include phenylene diisocyanate, tolylene diisocyanate, xylylene diisocyanate, bisphenylene diisocyanate, naphthylene diisocyanate, diphenylmethane diisocyanate, isophorone diisocyanate, cyclopentylene diisocyanate, cyclohexylene diisocyanate, methylcyclohexylene diisocyanate, dicyclohexylmethane diisocyanate, trimethylene diisocyanate, tetramethylene diisocyanate, pentamethylene diisocyanate, hexamethylene diisocyanate, propylene diisocyanate, ethylethylene diisocyanate, and trimethylhexamethylene diisocyanate.

A water-soluble polyester resin, an acrylic resin, a polyurethane resin, and the like are imparted with water solubility when they are neutralized with a basic substance. In this regard, an amount of the basic substance is preferably the one necessary for neutralizing 40 mol % or greater of an acid group contained in the water-soluble resin. Examples of the basic substance include ammonia, dimethylamine, trimethylamine, diethylamine, triethylamine, propylamine, triethanolamine, N-methylethanolamine, N-(aminoethyl)ethanolamine, N-methylethanolamine, morpholine, monoisopropanolamine, diisopropanolamine, and dimethylethanolamine.

Although there are no particular limitations on the number average molecular weight of the water-soluble resin, it is preferably within a range of 500 to 50000, more preferably within a range of 800 to 25000, and especially preferably within a range of 1000 to 12000.

A UV curable resin can be used to obtain the resin composition for forming first layer (a'). Representative examples of the UV curable resin include an unsaturated acrylic compound, polycinnamic acid vinyl, and an azide resin. Examples of the unsaturated acrylic compound include a monomer, oligomer, or a mixture thereof including one or a few acrylic or methacrylic unsaturated groups, which are a monomer or an oligoester having a molecular weight of 10,000 or less including propylene (or butylene or ethylene) glycol di(meth)acrylate and neopentyl glycol di(meth)acrylate and so on. Specific examples include Aronix M-210, Aronix M-215, Aronix M-220, Aronix M-233, Aronix M-240, Aronix M-245, which are special acrylates (bifunctional); Aronix M-305, Aronix M-309, Aronix M-310, Aronix M-315, Aronix M-320, Aronix M-325, which are trifunctional; and Aronix M-400, which is multifunctional (manufactured by Toagosei Co., Ltd.).

Although there are no particular limitations on the wax used for the resin composition for forming first layer (a'), examples of the wax used for the resin composition for forming first layer (a') include polyethylene-based wax, polypropylene-based wax, sasol wax, montan wax, paraffin wax, microcrystalline wax, carnauba wax, and shellac wax. As the wax, one kind of the above wax or two or more kinds of the above wax are used. Among the above kinds of wax, polyethylene-based wax and polypropylene-based wax are more preferable.

There are no particular limitations on the solvent used for the resin composition for forming first layer (a') as necessary. The solvent may be water or an organic solvent.

An organic solvent having a boiling point within a range of 50 to 250 degrees Celsius is preferable in terms of coating workability and drying properties before and after the curing. Specific examples of the solvent include: alcohol-based solvents such as methanol, ethanol, and isopropyl alcohol; ketone-based solvents such as acetone, butyl diglycol acetate, and MEK; ester-based solvents such as ethyl acetate, butyl acetate, 3-ethoxypropanoic acid ethyl ester (EEP); ether-based solvents such as dibutyl ether, ethylene glycol, and monobutyl ether; aromatic solvents such as toluene, xylene, Solvesso 150 (manufactured by Tonen General Sekiyu K.K.); and aprotic polar solvents such as N-methyl-2-pyrrolidone. These solvents may be used individually, or in mixtures containing two or more solvents.

Additives such as a pigment, a wet penetrant, an anti-skinning agent, an ultraviolet absorber, an antioxidant, a cross-linker, a preservative, a fungicide, a viscosity modifier, a pH adjuster, a levelling agent, and an anti-forming agent may be compounded in the resin composition for forming first layer (a') as appropriate within the limit not impairing the purpose of the present invention.

An example of the black pigment used for the resin composition for forming first layer (a') includes carbon black. Specific examples of the carbon black include ketjen black, acetylene black, furnace black, and channel black. Moreover, carbon black secondarily produced when partially oxidizing carbon hydride such as naphtha in the presence of hydrogen and oxygen to manufacture synthesis gas containing hydrogen and carbon monoxide or carbon black obtained by further oxidizing or reducing the secondarily produced carbon black may be used.

Carbon nanotubes may be used as the black pigment for the resin composition for forming first layer (a'). As carbon nanotubes absorb more visible light than carbon black, a layered product with higher jet-black can be obtained when the carbon nanotubes are used. The carbon nanotube has a shape obtained by wrapping planar graphite into a cylinder. As the carbon nanotubes, single-walled carbon nanotubes (SWCNTs) that each have a structure in which one graphite layer is wrapped or multi-walled carbon nanotubes (MWCNTs) that each have a structure in which two or more graphite layers are wrapped may be used, or carbon nanotubes in which both SWCNTs and MWCNTs are present may be used. MWCNTs are preferable to SWCNTs as they are lower in cost and have a better coloring effect than SWCNTs The sidewalls of the carbon nanotubes may not have the structure of graphite and may instead have an amorphous structure.

There are no particular limitations on the shape of the carbon nanotubes. Examples of the shapes of the carbon nanotubes are, needles, cylindrical tubes, fishbone (cup stacked type), card-like (platelets), and coiled. Examples of the carbon nanotubes include graphite whiskers, filamentous carbon, graphite fibers, ultrafine carbon tubes, carbon tubes, carbon fibrils, carbon microtubes, carbon nanofibers. As the carbon nanotubes, one of the above carbon nanotubes may be used or two or more of the above carbon nanotubes may be combined.

In the present invention, carbon nanotubes having shapes other than fishbone (cup stacked type), card-like (platelets), and coiled are preferable. The carbon nanotubes shaped in fishbone or card-like are cut on a layered plane (x-y plane) of the cup/card-like graphite sheet by a shear stress generated during manufacture of a resin composition and a molding. As a result, the carbon nanotubes cannot build a sufficient network structure in the resin, which could possibly lead to a reduction in the light confinement effect and a reduction in jet-black. Also in the coiled carbon nanotubes, a three-dimensional structure of the carbon nanotubes is easily destroyed during manufacture thereof, and thus the coloring effect may be reduced.

A fiber diameter of the carbon nanotubes is preferably within a range of 1 to 500 nm and more preferably within a range of 5 to 50 nm in terms of easiness in dispersion and a color phase.

A fiber length of the carbon nanotubes is preferably within a range of 0.1 to 150 μm and more preferably within a range of 1 to 50 μm in terms of easiness in dispersion and a color phase.

In 100 mass % of carbon nanotubes, a carbon purity of the carbon nanotubes is preferably 80 mass % or greater, more preferably 90 mass % or greater, and even more preferably 95 mass % or greater.

The carbon nanotubes are usually present as secondary particles. The form of the secondary particles may be, for example, carbon nanotubes, which are common primary particles, entangled in a complex manner or may be an aggregate of linear carbon tubes that can easily loosen. The secondary particles formed in an aggregate of linear carbon nanotubes are more preferable than the entangled secondary particles in terms of dispersibility.

The carbon nanotubes may be surface treated or carbon nanotube derivatives provided with functional groups such as carboxyl groups. Alternatively, carbon nanotubes or the like containing organic compounds, metals atoms, fullerene or the like may be used.

(2) First Layer (a)

A first layer (a) is obtained by using the resin composition for forming first layer (a') and at least contains a black pigment and a resin, and a value of $L^*$ in the $L^*a^*b^*$ color system defined by JIS Z8729 is ten or less. The first layer (a) may also be referred to as a color base layer (a). A substrate layer may be provided under the first layer (a).

There are no particular limitations on a material of the substrate. Examples of the material of the substrate includes: metals such as iron, aluminum, copper, or their alloys; an inorganic material such as glass, cement, concrete, etc.; resins such as a polyethylene resin, a polypropylene resin, an ethylene-vinyl acetate copolymer resin, a polyamide resin, an acrylic resin, a vinylidene chloride resin, a polycarbonate resin, a polyurethane resin, a polyester resin, an epoxy resin, etc.; a plastic material such as FRP, etc., wood, and a natural or synthetic material such as a fiber material (paper, a cloth etc.). The substrate material is formed in, for example, a film or a sheet.

An optimal method for forming the first layer (a) may be selected according to properties of the resin composition to be used and the substrate for forming the layer. Examples of the methods for forming the first layer (a) include: dry methods such as heating and curing, vacuum deposition, EB deposition, and sputter deposition; wet coating methods such as casting, spin coating, dip coating, bar coating, spraying, blade coating, slit die coating, gravure coating, reverse roll coating, screen printing, mold coating, print transfer, and inkjet, etc.; and common methods such as an injection molding method, an injection compression molding method, an extrusion molding method, a blow molding, etc.

A film thickness of the first layer (a) is preferably 0.5 μm or greater and more preferably 1 μm or greater. When the film thickness of the first layer (a) is less than 0.5 μm, blackness of the layered product may be lowered.

The content of carbon nanotubes in the materials constituting the first layer is preferably within a range of 1 to 20 mass % and more preferably within a range of 5 to 10 mass %. Excellent jet-black can be achieved with the carbon nanotubes contained within the above ranges.

The value of $L^*$ of the first layer (a) can be measured by using a color meter from a direction of the first layer plane that is stacked on the substrate. A layered product (c) that is excellent in jet-black can be obtained with the above value within the above ranges. The smaller the value of $L^*$, the higher the blackness (lower the brightness) becomes.

(3) Resin Composition for Forming Second Layer (b')

At least carbon nanotubes and a resin are used to obtain the resin composition for forming second layer (b'). A solvent can be added to the resin composition for forming second layer (b') as necessary. Moreover, an additive such as a dispersant and the like may be added to the resin composition for forming second layer (b') as necessary. There are no particular limitations on a method of making the resin composition for forming second layer (b'). Examples of preferred method of making the resin composition for forming second layer (b') are the same as those described regarding the resin composition for forming first layer (a').

The dispersant used for the resin composition for forming second layer (b') is not particularly limited within the scope of the present invention. Examples of a preferred dispersant used for the resin composition for forming second layer (b') are the same as those described regarding the resin composition for forming first layer (a').

The resin used for the resin composition for forming second layer (b') is not particularly limited within the scope of the present invention. Examples of a preferred resin used for the resin composition for forming second layer (b') are the same as those described regarding the resin composition for forming first layer (a').

A preferred example of the resin used for the resin is a two-pack clear coating (e.g., two-pack curable urethane coating) that uses a polyol resin containing a hydroxyl group as a main resin and isocyanate as a curing agent in terms of favorable appearance of the obtained clear coating and excellent acid resistance. There are no particular limitations on the polyol resin used as the main resin and the isocyanate. Examples of the compound used for the resin composition for forming second layer (b') are the same as those described regarding the resin composition for forming first layer (a').

There are no particular limitations on the solvent used for the resin composition for forming second layer (b'). The solvent may be water or an organic solvent. Examples of the organic solvent used for the resin composition for forming second layer (b') are the same as those described regarding the resin composition for forming first layer (a').

A ultraviolet absorber, a light stabilizer, a surface control agent, and the like may be further added to the resin composition for forming second layer (b') as appropriate. Moreover, an interference pattern pigment such as a coloring pigment, a metallic pigment, mica, and the like may be compounded in such a way that transparency of the coating film will not be impaired.

The carbon nanotube used for the resin composition for forming second layer (b') has a shape obtained by wrapping planar graphite into a cylinder. As the carbon nanotubes, single-walled carbon nanotubes (SWCNTs) that each have a structure in which one graphite layer is wrapped or multi-walled carbon nanotubes (MWCNTs) that each have a structure in which two or more graphite layers are wrapped may be used, or carbon nanotubes in which both SWCNTs and MWCNTs are present may be used. In terms of being advantageous in cost and coloring effect, MWCNTs are preferable. The sidewalls of the carbon nanotubes may not have the structure of graphite and may instead have the amorphous structure.

There are no particular limitations on the shape of the carbon nanotubes. Examples of the shapes of the carbon nanotubes are, needles, cylindrical tubes, fishbone (cup stacked type), card-like (platelets), and coiled. Examples of the carbon nanotubes include graphite whiskers, filamentous carbon, graphite fibers, ultrafine carbon tubes, carbon tubes, carbon fibrils, carbon microtubes, carbon nanofibers etc. As the carbon nanotubes, one of the above carbon nanotubes may be used or two or more of the above carbon nanotubes may be combined.

In the present invention, carbon nanotubes having shapes other than fishbone (cup stacked type), card-like (platelets), and coiled are preferable. The carbon nanotubes shaped in fishbone or card-like are cut on a layered plane (x-y plane) of the cup/card-like graphite sheet by a shear stress generated during manufacture of a resin composition and a molding. As a result, the carbon nanotubes cannot build a sufficient network structure in the resin, which could possibly lead to a reduction in the light confinement effect and a reduction in jet-black. Also in the coiled carbon nanotubes, a three-dimensional structure of the carbon nanotubes are readily destroyed during manufacture, and the coloring effect may be reduced.

A fiber diameter of the carbon nanotubes is preferably within a range of 1 to 500 nm and more preferably within a range of 5 to 50 nm in terms of easiness in dispersion and a color phase.

A fiber length of the carbon nanotubes is preferably within a range of 0.1 to 150 μm and more preferably within a range of 1 to 50 μm in terms of easiness in dispersion and a color phase.

In 100 mass % of carbon nanotubes, a carbon purity of the carbon nanotubes is preferably 80 mass % or greater, more preferably 90 mass % or greater, and even more preferably 95 mass % or greater.

The carbon nanotubes are usually present as secondary particles. The form of the secondary particles may be, for example, carbon nanotubes, which are common primary particles, entangled in a complex manner or may be an aggregate of linear carbon tubes that can easily loosen. The secondary particles formed in an aggregate of linear carbon nanotubes are more preferable than the entangled secondary particles in terms of dispersibility.

The carbon nanotubes may be surface treated or carbon nanotube derivatives provided with functional groups such as carboxyl groups. Alternatively, carbon nanotubes or the like containing organic compounds, metals atoms, fullerene or the like may be used.

(4) Second Layer (b)

A second layer (a) is obtained by using the resin composition for forming second first layer (b') and contains 0.1 to 1 mass % of carbon nanotubes. The second layer (b) may also be referred to as a color clear layer (b).

An optimal method for forming the second layer (b) on the first layer (a) may be selected according to a substance to be formed. Examples of the methods for forming the second layer (b) include common methods, which are: dry methods such as heating and curing, vacuum deposition, EB deposition, and sputter deposition; wet coating methods such as casting, spin coating, dip coating, bar coating, spraying, blade coating, slit die coating, gravure coating, reverse roll coating, screen printing, mold coating, print transfer, and inkjet, etc. The second layer (b) that has already been manufactured may be laminated, and the first layer (a) and the second layer (b) may not necessarily be firmly attached to each other.

An average transmittance of the second layer (b) at a wavelength within a range of 380 to 780 nm is preferably within a range of 5 to 80% and more preferably within a range of 10 to 30%. A layered product (c) that is excellent in jet-black can be obtained with the transmittance of the second layer (b) within the above ranges.

The average transmittance is obtained by firstly measuring transmittance spectra by every 5 nm in a wavelength range of 300 to 1500 nm on a layered product, in which only a second layer formed of the resin composition for forming second layer (b') is formed by a bar coater and stacked on a substrate, which is a PET (polyethylene terephthalate) film (Lumirror 100 and T60 manufactured by Toray Industries, Inc.). The measurement is performed by using a UV-visible near infrared spectrophotometer (UV-3500 manufactured by Hitachi High-Technologies Corporation) and on the plane where the second layer (b) is stacked on the substrate. Secondly, weighted average values of the respective transmittance at the wavelength in the range of 380 to 780 nm are calculated to obtain the average transmittance.

A film thickness of the second layer (b) is preferably 0.5 μm or greater and more preferably 1 μm or greater. Further, it is preferably 40 μm or less. If the film thickness of the second layer (b) is 0.5 μm or greater, the carbon nanotubes in the second layer (b) can effectively reduce and absorb scattered light. If the film thickness of the second layer (b) is 40 μm or less, incident light will not be completely blocked by the second layer (b), and a sufficient effect can be achieved by the layered product.

(5) Layered Product (c)

The layered product (c) of the present invention is composed of at least two layers, which are the first layer (a) and the second layer (b). Other layers may be provided between the first layer (a) and the second layer (b) without departing from the scope of the present invention. Moreover, a transparent protective layer and the like may be provided on the second layer.

If the layered product (c) is incorporated into an auto body and an automobile member, undercoating, intermediate coating, and the like are preferably applied on a part where the layered product (c) is formed by chemical conversion treatment, electrodeposition coating, or the like. The intermediate coating is applied to form a coating film in order to conceal the undercoating, provide chip resistance, and ensure adhesion with the first layer (a), which is an upper coating.

As a method of forming the layered product (c) of the present invention, one of the following methods may be employed. In a first method, the second layer (b) is formed, after the first layer (a) is formed and before the first layer (a) is heated and cured, and then the coatings are collectively heated and cured (wet-on-wet method). In a second method, the first layer (a) is formed and then heated and cured, and after that, the second layer (b) is formed and then heated and cured (wet-on-dry method).

A value of $L^*$ in the $L^*a^*b^*$ color system defined by JIS Z8729 when the layered product (c) is measured on the side of the second layer is preferably 2.5 or less and more preferably 2.0 or less. Further, a value of a* is preferably −2.0 or greater and 2.0 or less. A value of b* is preferably −2.0 or greater and 0.5 or less, more preferably −2.0 or greater and 0 or less, and even more preferably −2.0 or greater and −1.0 or less. A layered product (c) that is excellent in jet-black can be obtained with the above values within the above ranges. The smaller the value of L*, the higher the blackness (lower the brightness) becomes. The closer the values of a* and b* to zero, the more black the color phase is. Further, the smaller the value of b* in a negative value, the more blue the color phase is. Accordingly, with regard to the jet-black, as jet-black is considered to be high when black has a slight bluish tint, the above ranges of the numerical values is preferable.

At 60° gloss of a gloss meter GM-26D (manufactured by Murakami Color Research Laboratory Co., Ltd.), a gloss value is preferably 80 or greater and more preferably 85 or greater. The layered product (c) that is excellent in jet-black can be obtained with the gloss value within the above range because the value of L* can be reduced by glossiness.

It is obvious that the present invention is not limited to the above exemplary embodiment, and other embodiments could fall within the scope of the present invention as long as they conform to the gist of the present invention.

The layered product of the present invention has a structure in which at least the first layer (a) having the value of L* of ten or less, which is the color base layer, and the second layer (b), which is the color clear layer containing a particular content of carbon nanotubes, and which is stacked on the first layer (a), are included. Further, the layered product having values of L*, a*, and b* in the L*a*b* color system defined by JIS Z8729 in particular ranges can achieve a low brightness and high jet-black, thereby achieving a black coating with a feeling of depth in color.

EXAMPLES

Although the present invention will be described in more detail based on examples, the present invention is not limited to the following examples. Note that the symbol "%" alone in the following examples indicates "mass %".

<Preparation Example of Resin Composition for Forming First Layer>

Preparation Example 1

<Resin Composition for Forming First Layer (A1)>
Carbon black (COLOR Black FW-200 manufactured by Degussa Co., Ltd.) 3 g as the black pigment, an acrylic resin (Acrylidic 47-712 manufactured by DIC Corporation) 83 g, and a melamine resin (Super Beckamine L-117-60 manufactured by DIC Corporation) 17.1 g as the resin, Solvesso 150 (manufactured by Tonen General Sekiyu K.K.) 8.1 g, toluene 12.2 g, xylene 12.2 g, and butyl acetate 8.1 g as the solvents were placed into a glass bottle of 225 cm$^3$ and dispersed for an hour by a paint shaker using zirconia beads as media to thereby obtain a resin composition for forming first layer (A1).

Preparation Example 2

<Resin Composition for Forming First Layer (A2)>
A resin composition for forming first layer (A2) was obtained in a manner similar to that of the preparation example 1 except that carbon black (manufactured by Mitsubishi Carbon, MA-100) 3 g was used as the black pigment.

Preparation Example 3

<Resin Composition for Forming First Layer (A3)>
A block polypropylene copolymer (Prime Polyplo 966HP manufactured by Prime Polymer Co., Ltd.) 1000 g as the resin, carbon black (MA-100 manufactured by Mitsubishi Carbon Corporation) 20 g as the black pigment, and polyethylene wax (Sanwax 151P melt viscosity=130 mPa·s manufactured by Sanyo Chemical Industries, Ltd.,) 1 g were placed in a Henschel mixer, stirred, and mixed for four minutes at an agitation rotation speed of 300 rpm. The resultant mixture was placed in a twin screw extruder (TEX 30α manufactured by The Japan Steel Works, Ltd.) at a temperature of 220 degrees Celsius and then melted, kneaded, and granulated to thereby obtain a resin composition for forming first layer (A3).

Preparation Example 11

<Resin Composition for Forming First Layer (A4)>
A resin composition for forming first layer (A4) was obtained in a manner similar to that of the preparation example 1 except that carbon nanotubes (NC-7000, MWCNT, fiber length 1.5 μm, fiber diameter 9.5 nm, and carbon purity 90% manufactured by Nanocyl SA.) 3 g was used as the black pigment.

Preparation Example 12

<Resin Composition for Forming First Layer (A5)>
Carbon black (COLOR Black FW-200 manufactured by Degussa Co., Ltd.) 3 g as the black pigment, acrylic polyol for two-pack type water borne urethane coating resins (Burnock WE-300 manufactured by DIC Corporation) 74.5 g as the resin, and isocyanate (Burnock DNW-5500 manufactured by DIC Corporation) 33 g, and purified water 150 g as the solvent were placed in a glass bottle of 445 cm$^3$ and dispersed for an hour by a paint shaker using zirconia beads as media to thereby obtain a resin composition for forming first layer (A5).

Preparation Example 13

<Resin Composition for Forming First Layer (A6)>
Carbon black (COLOR Black FW-200 manufactured by Degussa Co., Ltd.) 1.05 g as the black pigment, an epoxy resin (JER 4250 manufactured by Mitsubishi Chemical Corporation) as the resin were dissolved in butyl carbitol acetate, and a non-volatile fraction of a resultant epoxy resin solution 50 g was adjusted to 40%. This epoxy resin solution 50 g was kneaded and dispersed three times by using a hoover muller under conditions in which a load is 150 lb(=667N) and a rotational speed is 100 rpm to thereby obtain a resin composition for forming first layer (A6).

Preparation Example 14

<Resin Composition for Forming First Layer (A7)>
Carbon black (COLOR Black FW-200 manufactured by Degussa Co., Ltd.) 3.0 g as the black pigment, an acrylic polyol resin (Acrylidic A-801-P manufactured by DIC Corporation) 24.0 g as the resin, a mixed solvent 88.4 g containing toluene:butyl acetate having a mass ratio of 7:3 as the solvent, a resin-type dispersant (BYK111 manufactured by BYK Chemie GmbH) 1 g as the dispersant were placed in a glass bottle of 225 cm³ and dispersed for an hour by a paint shaker using zirconia beads as media to thereby obtain a dispersion. Right before the coating, 100 pts·mass of this dispersion, 78.1 pts·mass of an acrylic polyol resin (Acrylidic A-801-P manufactured by DIC Corporation), and 29.6 pts·mass of an isocyanate resin (Burnock DN-950 manufactured by DIC Corporation) were stirred by a high-speed stirrer to thereby obtain a resin composition for forming first layer (A7).

Preparation Example 15

<Resin Composition for Forming First Layer (A8)>
Carbon black (COLOR Black FW-200 manufactured by Degussa Co., Ltd.) 3.0 g as the black pigment, tripropylene glycol diacrylate (Aronix M-220 manufactured by Toagosei Co., Ltd.) 61.5 g, polyester acrylate (Ebecryl 812 manufactured by Diacel-Allnex Ltd.) 28.5 g, cyclohexanone 12.5 g, and a photopolymerization initiator (Irgacure 907 manufactured by BASF Japan Co., Ltd.) were kneaded three times by using a hoover muller under conditions in which a load is 150 lb(=667 N) and a rotational speed is 100 rpm to thereby obtain a resin composition for forming first layer (A8).

Preparation Example 16

<Resin Composition for Forming First Layer (A9)>
A polyester resin (Vylon GK-130 manufactured by Toyobo Co., Ltd.) as the resin was dissolved in a mixed solution containing methyl ethyl ketone/toluene=50/50 (mass ratio) to thereby obtain a polyester resin solution of 40% non-volatile fraction. Next, carbon black (COLOR Black FW-200 manufactured by Degussa Co., Ltd.) 3 g as the black pigment, the above polyester resin solution 142 g as the resin, and a mixed solution containing methyl ethyl ketone/toluene=50/50 (mass ratio) 50 g as the solvent were kneaded three times by using a hoover muller under conditions in which a load is 150 lb(=667 N) and a rotational speed is 100 rpm to thereby obtain a resin composition for forming first layer (A9).

[Method of Measuring Value of L* of First Layer Obtained from Resin Composition for Forming First Layer]
With respect to the resin compositions for forming first layer (A1 and A2), using a PET film (Lumirror 100 and T60 manufactured by Toray Industries, Inc.) as a substrate, the resin compositions for forming first layer (A1 and A2) were applied to the substrate by using a bar coater in such a way that a film thickness became 20 μm after the resin compositions for forming first layer (A1 and A2) were dried. After that, the film was dried for 60 minutes at 150 degrees Celsius±5 degrees Celsius in an electric oven to thereby form a layer on the substrate. Then, a brightness (L*) defined by JIS Z8729 was measured by using a color meter (SpectroColorMeterSE2000 manufactured by NIPONDENSHOKU Industries, Co., Ltd) from a direction of the plane where the layer was stacked. The resin composition for forming first layer (A3) was placed in an injection molding machine (M-50A2-DM manufactured by Meiko Co., Ltd.) in which a cylinder temperature is 220 degrees Celsius and a mold temperature is 40 degrees Celsius so that it will be molded to thereby form a layer of a plate material (length 110 mm×width 90 mm×thickness 2 mm), a surface of which is mirror-finished. A value of L* was measured in a manner similar to the above case.

With respect to the resin compositions for forming first layer (A4 to A9), values of L* were measured in a manner similar to the resin compositions for forming first layer (A1 and A2).

<Preparation Example of Resin Composition for Forming Second Layer>f

Preparation Example 4

<Resin Composition for Forming Second Layer (B1)>
Carbon nanotubes (NC-7000, MWCNT, fiber length 1.5 μm, fiber diameter 9.5 nm, and carbon purity 90% manufactured by Nanocyl SA.) 0.09 g, an acrylic resin (Acrylidic 44-179 manufactured by DIC Corporation) 120 g and a melamine resin (Super Beckamine L-117-60 manufactured by DIC Corporation) 30 g as the resins, Solvesso 150 (Tonen General Sekiyu K.K.) 10 g, Ektapro EEP (manufactured by Eastman Kodak Company) 5 g, toluene 15 g, xylene 10 g, and ethyl acetate 10 g as the solvents were placed in a glass bottle of 225 cm³ and dispersed for an hour by a paint shaker using zirconia beads as media to thereby obtain a resin composition for forming second layer (B1).

Preparation Example 5

<Resin Composition for Forming Second Layer (B2)>
A resin composition for forming second layer (B2) was obtained in a manner similar to that of the preparation example 4 except that 0.45 g of carbon nanotubes was used.

Preparation Example 6

<Resin Composition for Forming Second Layer (B3)>
A resin composition for forming second layer (B3) was obtained in a manner similar to that of the preparation example 4 except that the amount of the carbon nanotubes was changed to 0.90 g.

Preparation Example 7

<Resin Composition for Forming Second Layer (B4)>
A resin composition for forming second layer (B4) was obtained in a manner similar to that of the preparation example 4 except that carbon black (COLOR Black FW-200 manufactured by Degussa Co., Ltd.) 0.45 g was used in place of the carbon nanotubes.

Preparation Example 8

<Resin Composition for Forming Second Layer (B5)>
A resin composition for forming second layer (B5) was obtained in a manner similar to that of the preparation example 4 except that carbon black (MA-100 manufactured by Mitsubishi Carbon Corporation) 0.09 g was used in place of the carbon nanotubes.

Preparation Example 9

<Resin Composition for Forming Second Layer (B6)>
A resin composition for forming second layer (B6) was obtained in a manner similar to that of the preparation example 8 except that carbon black 0.45 g was used.

Preparation Example 10

<Resin Composition for Forming Second Layer (B7)>
A resin composition for forming second layer (B7) was obtained in a manner similar to that of the preparation example 8 except that carbon black 0.9 g was used.

Preparation Example 17

<Resin Composition for Forming Second Layer (B8)>
Carbon nanotubes (NC-7000 manufactured by Nanocyl SA.) 0.45 g, acrylic polyol for two-pack type water borne urethane coating resins (Burnock WE-300 manufactured by DIC Corporation) 74.5 g as the resin, and isocyanate (Burnock DNW-5500 manufactured by DIC Corporation) 33 g, and purified water 150 g as the solvent were placed in a glass bottle of 445 cm$^3$ and dispersed for an hour by a paint shaker using zirconia beads as media to thereby obtain a resin composition for forming second layer (B8).

Preparation Example 18

<Resin Composition for Forming Second Layer (B9)>
Carbon nanotubes (NC-7000 manufactured by Nanocyl SA.) 0.45 g, an epoxy resin (JER 4250 manufactured by Mitsubishi Chemical Corporation) as the resin were dissolved in butyl carbitol acetate, and an NV of an obtained varnish 50 g was adjusted to 40%. This varnish 50 g was kneaded and dispersed three times by using a hoover muller under conditions in which a load is 150 lb(=667N) and a rotational speed is 100 rpm to thereby obtain a resin composition for forming second layer (B9).

Preparation Example 19

<Resin Composition for Forming Second Layer (B10)>
Carbon nanotubes (NC-7000 manufactured by Nanocyl SA.) 0.45 g, an acrylic polyol resin (Acrylidic A-801-P manufactured by DIC Corporation) 24.0 g as the resin, a mixed solvent 88.4 g containing toluene:butyl acetate having a mass ratio of 7:3 as the solvent, a resin-type dispersant (BYK111 manufactured by BYK Chemie GmbH) 1 g as the dispersant were placed in a glass bottle of 225 cm$^3$ and dispersed for an hour by a paint shaker using zirconia beads as media to thereby obtain a dispersion. Right before the coating, 100 pts·mass of this dispersion, 78.1 pts·mass of the acrylic polyol resin (Acrylidic A-801-P manufactured by DIC Corporation), and 29.6 pts·mass of the isocyanate resin (Burnock DN-950 manufactured by DIC Corporation) were stirred by a high-speed stirrer to thereby obtain a resin composition for forming second layer (B10).

Preparation Example 20

<Resin Composition for Forming Second Layer (B11)>
Carbon nanotubes (NC-7000 manufactured by Nanocyl SA.) 0.45 g, tripropylene glycol diacrylate (Aronix M-220 manufactured by Toagosei Co., Ltd.) 61.5 g, polyester acrylate (Ebecryl 812 manufactured by Diacel-Allnex Ltd.) 28.5 g, cyclohexanone 12.5 g, and a photopolymerization initiator (Irgacure 907 manufactured by BASF Japan Co., Ltd.) were kneaded three times by using a hoover muller under conditions in which a load is 150 lb(=667 N) and a rotational speed is 100 rpm to thereby obtain a resin composition for forming second layer (B11).

Preparation Example 21

<Resin Composition for Forming Second Layer (B12)>
Carbon nanotubes (Flotube 9000, MWCNT, fiber length 10 μm, fiber diameter 12.5 nm, and carbon purity 96.5% manufactured by CNano Technology Ltd.) 0.45 g, an acrylic resin (Acrylidic 44-179 manufactured by DIC Corporation) 120 g and a melamine resin (Super Beckamine L-117-60 manufactured by DIC Corporation) 30 g as the resins, Solvesso 150 (Tonen General Sekiyu K.K.) 10 g, Ektapro EEP (manufactured by Eastman Kodak Company) 5 g, toluene 15 g, xylene 10 g, and ethyl acetate 10 g as the solvents were placed in a glass bottle of 225 cm$^3$ and dispersed for an hour by a paint shaker using zirconia beads as media to thereby obtain a resin composition for forming second layer (B12).

Preparation Example 22

<Resin Composition for Forming Second Layer (B13)>
Carbon nanotubes (SMW210, MWCNT, fiber length 5 μm, fiber diameter 10 nm, and carbon purity 75% manufactured by SouthWest NanoTechnologies, Inc.) 0.45 g, an acrylic resin (Acrylidic 44-179 manufactured by DIC Corporation) 120 g and a melamine resin (Super Beckamine L-117-60 manufactured by DIC Corporation) 30 g as the resins, Solvesso 150 (Tonen General Sekiyu K.K.) 10 g, Ektapro EEP (manufactured by Eastman Kodak Company) 5 g, toluene 15 g, xylene 10 g, and ethyl acetate 10 g as the solvents were placed in a glass bottle of 2.25 cm$^3$ and dispersed for an hour by a paint shaker using zirconia beads as media to thereby obtain a resin composition for forming second layer (B13).

Preparation Example 23

<Resin Composition for Forming Second Layer (B14)>
Carbon nanotubes (NC-7000 manufactured by Nanocyl SA.) 4.05 g, an acrylic resin (Acrylidic 44-179 manufactured by DIC Corporation) 120 g and a melamine resin (Super Beckamine L-117-60 manufactured by DIC Corporation) 30 g as the resins, Solvesso 150 (Tonen General Sekiyu K.K.) 10 g, Ektapro EEP (manufactured by Eastman Kodak Company) 5 g, toluene 15 g, xylene 10 g, and ethyl acetate 10 g as the solvents were placed in a glass bottle of 225 cm$^3$ and dispersed for an hour by a paint shaker using zirconia beads as media to thereby obtain a resin composition for forming second layer (B14).

[Method of Measuring Average Transmittance of Second Layer Obtained from Resin Composition for Forming Second Layer]

With respect to the obtained resin compositions for forming second layer, using a PET film (Lumirror 100 and T60 manufactured by Toray Industries, Inc.) as a substrate, the resin compositions for forming second layer were applied to the substrate by using a bar coater in such a way that a film thickness became 20 μm after the resin compositions for forming second layer were dried. After that, the film was dried for 60 minutes at 150 degrees Celsius±5 degrees Celsius in an electric oven. The average transmittance of the obtained layer is calculated by firstly measuring transmittance spectra by every 5 nm in a wavelength range of 300 to 1500 nm on the plane where the second layer is stacked on the substrate by using a UV-visible near infrared spectrophotometer (UV-3500 manufactured by Hitachi High-Technologies Corporation). Secondly, weighted average values of the respective transmittance at the wavelength in the range of 380 to 780 nm are calculated to obtain the average transmittance.

Table 1 shows preparation conditions and evaluation results of the resin compositions for forming first layer and the resin compositions for forming second layer that were prepared in the preparation examples 1 to 23.

tion for forming first layer (A1) was applied to the substrate in such a way that a film thickness became 20 μm after the resin composition for forming first layer (A1) was dried. After that, the film was dried for 60 minutes at 150 degrees Celsius±5 degrees Celsius in an electric oven to thereby form a first layer on the substrate. Then, a value of L* of the first layer was measured by the abovementioned method. The resin composition for forming second layer (B1) was applied on the first layer by using an air spray in such a way that a film thickness became 20 μm after the resin composition for forming second layer (B1) was dried. The obtained coating film surface was dried for 20 minutes in the electronic oven at 150 degrees Celsius±5 degrees Celsius to thereby form a second layer on the first layer, so that a layered product (C1) is obtained.

TABLE 1

|  | Resin composition | Pigment | Resin | Pigment Content[1] | L* | Average transmittance (%) |
|---|---|---|---|---|---|---|
| Preparation example 1 | A1 | FW-200 | Acrylidic 47-712 Super Beckamine L-117-60 | 5.0 | 2.6 | — |
| Preparation example 2 | A2 | MA-100 | Acrylidic 47-712 Super Beckamine L-117-60 | 5.0 | 4.8 | — |
| Preparation example 3 | A3 | MA-100 | Prime Polyplo 966HP | 5.0 | 9.6 | — |
| Preparation example 4 | B1 | NC-7000 | Acrylidic 44-179 Super Beckamine L-117-60 | 0.1 | — | 78 |
| Preparation example 5 | B2 | NC-7000 | Acrylidic 44-179 Super Beckamine L-117-60 | 0.5 | — | 16 |
| Preparation example 6 | B3 | NC-7000 | Acrylidic 44-179 Super Beckamine L-117-60 | 1.0 | — | 10 |
| Preparation example 7 | B4 | FW-200 | Acrylidic 44-179 Super Beckamine L-117-60 | 0.5 | — | 23 |
| Preparation example 8 | B5 | MA-100 | Acrylidic 44-179 Super Beckamine L-117-60 | 1.0 | — | 85 |
| Preparation example 9 | B6 | MA-100 | Acrylidic 44-179 Super Beckamine L-117-60 | 0.5 | — | 30 |
| Preparation example 10 | B7 | MA-100 | Acrylidic 44-179 Super Beckamine L-117-60 | 1.0 | — | 17 |
| Preparation example 11 | A4 | NC-7000 | Acrylidic 47-712 Super Beckamine L-117-60 | 5.0 | 2.8 | — |
| Preparation example 12 | A5 | FW-200 | Burnock WE-300 Burnock DNW-45500 | 5.0 | 3.5 | — |
| Preparation example 13 | A6 | FW-200 | JER4250 | 5.0 | 2.6 | — |
| Preparation example 14 | A7 | FW-200 | Acrylidic A-801-P Burnock DN-950 | 5.0 | 3.1 | — |
| Preparation example 15 | A8 | FW-200 | Aronix M-220 Burnock B12 | 5.0 | 2.7 | — |
| Preparation example 16 | A9 | FW-200 | Vylon GK-130 | 5.0 | 2.9 | — |
| Preparation example 17 | B8 | NC-7000 | Burnock WE-300 Burnock DNW-5500 | 0.5 | — | 17 |
| Preparation example 18 | B9 | NC-7000 | JER4250 | 0.5 | — | 14 |
| Preparation example 19 | B10 | NC-7000 | Acrylidic A-801-P Burnock DN-950 | 0.5 | — | 16 |
| Preparation example 20 | B11 | NC-7000 | Aronix M-220 Burnock 812 | 0.5 | — | 10 |
| Preparation example 21 | B12 | Flotube 9000 | Acrylidic 44-179 Super Beckamine L-117-60 | 0.5 | — | 14 |
| Preparation example 22 | B13 | SMW210 | Acrylidic 44-179 Super Beckamine L-117-60 | 0.5 | — | 23 |
| Preparation example 23 | B14 | NC-7000 | Acrylidic 4-1-179 Super Beckamine L-117-60 | 4.5 | — | 0 |

[1]mass % to content of coating film solid

<Preparation of Layered Product>

Figure 1:
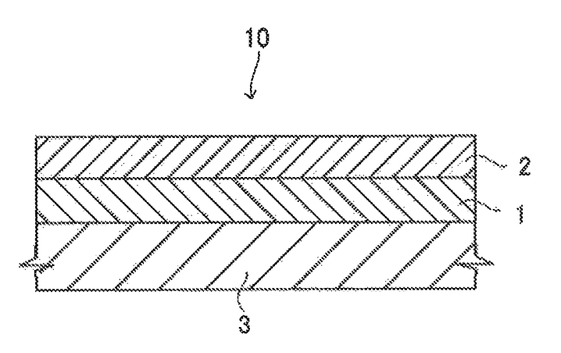
FIG. 1 is a drawing showing a structure of a layered product according to an exemplary embodiment.

The layered product according to this example will be described with reference to FIG. 1. As shown in FIG. 1, the layered product is a layered product 10 (the layered product (c)) obtained by stacking a first layer 1, which is the first layer (a), and a second layer 2, which is the second layer (b), in this order on a substrate 3.

The layered product 10 was obtained by applying the second layer (b) composed of a single layer or a plurality of layers having a concentration(s) of the carbon nanotubes and a film thickness(es) that allow incident light to be transmitted therethrough to the first layer (a) having a brightness L* of 10.0 or less so that no incident light will be transmitted therethrough and by baking the layered product to thereby obtain the layered product with a surface roughness of ±2 μm or less. Values of L*, a*, and b*, gloss, and pitch black property were evaluated for the obtained layered products.

Example 1

Using a PET film (Lumirror 100 and T60 manufactured by Toray Industries, Inc.) as a substrate, the resin composi- Examples 2, 4 to 9, 11 to 14, 16, and 17, Comparative Examples 1 to 6

Layered products (C2, C4 to C11, C12 to C15, C17 to C20, C22, and C23) were prepared by the method similar to the method in example 1 except that the combinations of the resin compositions for forming first layer and the resin compositions for forming second layer are changed to those shown in Table 2.

Example 3

The resin composition for forming first layer (A3) was placed in an injection molding machine (M-50A2-DM manufactured by Meiko Co., Ltd.) in which a cylinder temperature is 220 degrees Celsius and a mold temperature is 40 degrees Celsius so that it will be molded to thereby form a layer of a plate material (length 110 mm×width 90 mm×thickness 2 mm), a surface of which is mirror-finished. A value of L* of the first layer was measured by the abovementioned method. The resin composition for forming second layer (B3) was applied on the first layer by using an air spray in such a way that a film thickness became 20 μm after the resin composition for forming second layer (B3) was dried. The obtained coating film surface was dried for 20 minutes in the electronic oven at 150 degrees Celsius±5 degrees Celsius to thereby form a second layer on the first layer, so that a layered product (C3) is obtained.

Example 10

Using a PET film (Lumirror 100 and T60 manufactured by Toray Industries, Inc.) as a substrate, the resin composition for forming first layer (A8) was applied to the substrate in such a way that a film thickness became 20 μm after the resin composition for forming first layer (A8) was dried. After that, the film was dried for 60 minutes at 150 degrees Celsius±5 degrees Celsius in an electric oven and irradiated with ultraviolet and cured by using a conveyorized UV emitter to thereby form a first layer on the substrate. A value of L* of the first layer was measured by the abovementioned method. The resin composition for forming second layer (B2) was applied on the first layer by using an air spray in such a way that a film thickness became 20 μm after the resin composition for forming second layer (B2) was dried. The obtained coating film surface was dried for 20 minutes in the electronic oven at 150 degrees Celsius±5 degrees Celsius to thereby form a second layer on the first layer, so that a layered product (C16) is obtained.

Example 15

Using a PET film (Lumirror 100 and T60 manufactured by Toray Industries, Inc.) as a substrate, the resin composition for forming first layer (A1) was applied to the substrate in such a way that a film thickness became 20 μm after the resin composition for forming first layer (A1) was dried. After that, the film was dried for 60 minutes at 150 degrees Celsius±5 degrees Celsius in an electric oven to thereby form a first layer on the substrate. Then, a value of L* of the first layer was measured by the abovementioned method. The resin composition for forming second layer (B11) was applied on the first layer by using an air spray in such a way that a film thickness became 20 μm after the resin composition for forming second layer (B11) was dried. After that, the film was dried for 60 minutes at 150 degrees Celsius±5 degrees Celsius in an electric oven and irradiated with ultraviolet and cured by using a conveyorized UV emitter to thereby form a second layer on the first layer, so that a layered product (C21) is obtained.

Comparative Example 7

Using a PET film (Lumirror 100 and T60 manufactured by Toray Industries, Inc.) as a substrate, the resin composition for forming first layer (A1) was applied to the substrate in such a way that a film thickness became 20 μm after the resin composition for forming first layer (A1) was dried. After that, the film was dried for 60 minutes at 150 degrees Celsius±5 degrees Celsius in an electric oven to thereby form a first layer on the substrate. A value of L* of the first layer was measured by the abovementioned method. The resin composition for forming second layer (B14) was applied on the first layer by using an air spray in such a way that a film thickness became 20 μm after the resin composition for forming second layer (B14) was dried. The obtained coating film surface was dried for 20 minutes in the electronic oven at 150 degrees Celsius±5 degrees Celsius to thereby form a second layer on the first layer, so that a layered product (C24) is obtained.

A method of evaluation for these layered products is described below.

[Evaluation of Jet-Black]

Jet-black was evaluated based on measurement values of the L*a*b* color system defined by JIS Z8729 when the layered product (c) is measured on the side of the second layer. More specifically, an evaluation is made based on whether or not (i) a value of L* is 2.5 or less, (ii) a value of a* is −2.0 or greater and 2.0 or less, and (iii) a value b* is −2.0 or greater and 0.5 or less. That is, the evaluation is made based on whether or not all of (i) to (iii) are satisfied. Moreover, among the layered products (c) that satisfy all of (i) to (iii), the layered products (c) having the value of b* of −1.0 or less are marked AA (excellent) and the layered products (c) having the value of other layered products (c) are marked A (good). Further, the layered products (c) that do not satisfy any one of (i) to (iii) are marked C.

[Method of Measuring L*a*b*]

A brightness (L*) and chromaticity (a* and b*) defined by JIS Z8729 was measured on the layered product (c) by using a color meter (SpectroColorMeterSE2000 manufactured by NIPONDENSHOKU Industries, Co., Ltd) from a direction of the plane where the color clear layer (b) was layered.

[Method of Evaluating Gloss]

At 60° gloss of a gloss meter GM-26D (manufactured by Murakami Color Research Laboratory Co., Ltd.), a gloss value was measured. The greater the gloss value, the more glossy the layered product becomes, which is favorable.

Table 2 shows preparation conditions and evaluation results of the layered products of Examples 1 to 17. Table 2 also shows values of L* of the first layers and average transmittances of the second layers measured by the abovementioned method.

TABLE 2

| Layered product (c) | First layer (a) Resin composition for forming first layer (a') | L* of first layer | Second layer (b) Resin composition for forming second layer (b') | Average transmittance of second layer (%) | Layered product (c) L* | a* | b* | Gloss value | Jet-black |
|---|---|---|---|---|---|---|---|---|---|
| Example 1 | C1 | A1 | 2.6 | B1 | 78 | 1.0 | 0.03 | −1.5 | 97 | AA |
| Example 2 | C2 | A2 | 4.8 | B1 | 78 | 1.2 | 0.02 | −1.1 | 96 | AA |
| Example 3 | C3 | A3 | 9.5 | B1 | 78 | 1.5 | 0.03 | −0.6 | 96 | A |
| Example 4 | C4 | A2 | 4.8 | B2 | 16 | 0.9 | 0.04 | −1.4 | 95 | AA |
| Example 5 | C5 | A2 | 4.8 | B3 | 10 | 1.0 | 0.04 | −0.7 | 87 | A |
| Example 6 | C12 | A4 | 2.8 | B2 | 16 | 0.5 | 0.02 | −1.5 | 97 | AA |
| Example 7 | C13 | A5 | 3.5 | B2 | 16 | 2.1 | 0.03 | −0.7 | 97 | A |
| Example 8 | C14 | A6 | 2.6 | B2 | 16 | 1.8 | 0.03 | −1.0 | 96 | AA |
| Example 9 | C15 | A7 | 3.1 | B2 | 16 | 0.9 | 0.08 | −1.1 | 95 | AA |
| Example 10 | C16 | A8 | 2.7 | B2 | 16 | 1.7 | 0.01 | −0.9 | 96 | A |
| Example 11 | C17 | A9 | 2.9 | B2 | 16 | 1.1 | 0.07 | −1.1 | 95 | AA |
| Example 12 | C18 | A1 | 2.6 | B8 | 17 | 2.3 | 0.02 | −0.8 | 91 | A |
| Example 13 | C19 | A1 | 2.6 | B9 | 14 | 1.8 | 0.03 | −1.1 | 89 | A |
| Example 14 | C20 | A1 | 2.6 | B10 | 16 | 1.1 | 0.03 | −1.3 | 96 | AA |
| Example 15 | C21 | A1 | 2.6 | B11 | 10 | 1.3 | 0.06 | −0.9 | 88 | A |
| Example 16 | C22 | A1 | 2.6 | B12 | 14 | 1.3 | 0.08 | −1.1 | 93 | AA |
| Example 17 | C23 | A1 | 2.6 | B13 | 23 | 1.4 | 0.09 | −1.5 | 93 | AA |

Table 3 shows preparation conditions and evaluation results of the layered products prepared in Comparative Examples 1 to 7. Table 3 also shows values of L* of the first layers and average transmittances of the second layers measured by the abovementioned method.

By comparing Example 4 with Example 6, it became clear that a layered product with high jet-black can be achieved by using carbon nanotubes in place of carbon black as the black pigment of the first layer (a).

TABLE 3

| Layered product (c) | First layer (a) Resin composition for forming first layer (a') | L* of first layer | Second layer (b) Resin composition for forming second layer (b') | Average transmittance of second layer (%) | Layered product (c) L* | a* | b* | Gloss value | Jet-black |
|---|---|---|---|---|---|---|---|---|---|
| Comparative example 1 | C6 | A1 | 2.6 | B4 | 23 | 3.2 | 0.08 | 1.1 | 98 | C |
| Comparative example 2 | C7 | A2 | 4.8 | B4 | 23 | 4.8 | 0.07 | 1.1 | 97 | C |
| Comparative example 3 | C8 | A3 | 9.5 | B4 | 23 | 6.1 | 0.05 | 1.3 | 97 | C |
| Comparative example 4 | C9 | A2 | 4.8 | B5 | 85 | 3.1 | 0.06 | 0.5 | 96 | C |
| Comparative example 5 | C10 | A2 | 4.8 | B6 | 30 | 2.8 | 0.08 | 0.7 | 96 | C |
| Comparative example 6 | C11 | A2 | 4.8 | B7 | 17 | 2.7 | 0.08 | 0.7 | 97 | C |
| Comparative example 7 | C24 | A1 | 2.8 | B14 | 0 | 8.1 | 0.04 | −0.96 | 6 | C |

Comparative Examples 1 to 6 are examples of the layered products that contain carbon black in the second layer as disclosed by Patent Literature 3. It will be understood that these layered products have jet-black that is more reduced than those of Examples of the present invention. That is, according to Examples, it is possible to achieve a layered product with improved jet-black as compared to the layered products according to Comparative Examples 1 to 6 that contain carbon black in the second layers. It will be also understood that the layered products according to Examples have excellent gloss values.

Furthermore, Comparative Example 7 shows an example of the layered product in which carbon nanotubes are added to the second layer (b), and an added content of the carbon nanotubes is not within the range of 0.1 to 1 mass % that has been specified in the present invention. It will be understood that in Comparative Example 7, jet-black is not achieved, and a gloss value is high. That is, when a particular content of carbon nanotubes is contained in the second layer (b), excellent jet-black and a gloss value can be achieved.

INDUSTRIAL APPLICABILITY

As a layered product according to the present invention has high jet-black and excellent molding processability, the layered product can be preferably used for houses and construction material use, auto bodies, automobile members, electric/electronic parts, sundries, films, and the like. The layered product according to the present invention is especially preferable for external members in which sophisticated design is desired and is preferably used for vehicle members, home appliance members, furniture parts, OA chassis use, film use, and the like.

The present application is based upon and claims the benefit of priority from Japanese Patent Application No. 2014-148454, filed on Jul. 22, 2014, the entire contents of which are hereby incorporated by reference.

REFERENCE SIGNS LIST

1 FIRST LAYER
2 SECOND LAYER

3 SUBSTRATE
10 LAYERED PRODUCT

The invention claimed is:

1. A layered product comprising at least two layers, a first layer and a second layer, wherein
in a L*a*b* color system defined by JIS Z8729,
a value of L* is 2.5 or less,
a value of a* is −2.0 or greater and 2.0 or less, and
a value of b* is −2.0 or greater and 0.5 or less, when the values are measured from a side of a plane of the second layer,
the first layer contains a resin and a black pigment, and a value of L* in a L*a*b* color system defined by JIS Z8729 of the first layer is ten or less, and
the second layer is formed on the first layer and contains a resin and carbon nanotubes; an average transmittance of the second layer at a wavelength within a range of 380 to 780 nm is 5% or greater and 80% or less; and 0.1 to 1 mass % of the carbon nanotubes are contained in a material constituting the second layer.

2. The layered product according to claim 1, wherein the second layer is formed by wet coating.

3. The layered product according to claim 1, wherein a film thickness of the first layer is 0.5 µm or greater and 20 µm or less.

4. The layered product according to claim 1, wherein a film thickness of the second layer is 0.5 µm or greater and 20 µm or less.

5. The layered product according to claim 1, wherein the first layer is formed by melting and kneading.

6. The layered product according to claim 1, wherein 1 to 20 mass % of carbon nanotubes are contained in a material constituting the first layer.

7. A method of manufacturing a layered product according to claim 1, the layered product comprising at least two layers, a first layer and a second layer, the method comprising:
forming the first layer having a value of L* in a L*a*b color system defined by JIS Z8729 of ten or less; and
forming the second layer on the first layer by wet coating, wherein
0.1 to 1 mass % of carbon nanotubes are contained in the second layer, and
a value of L* is 2.5 or less, a value of a* is −2.0 or greater and 2.0 or less, and a value of b* is −2.0 or greater and 0.5 or less, when the values are measured from a side of a plane of the second layer.

8. The method of manufacturing the layered product according to claim 7, wherein the first layer is formed by melting and kneading.

9. The method of manufacturing the layered product according to claim 7, wherein an average transmittance of the second layer at a wavelength within a range of 380 to 780 nm is 5% or greater and 80% or less.

10. The method of manufacturing the layered product according to claim 7, wherein a film thickness of the first layer is 0.5 µm or greater and 20 µm or less.

11. The method of manufacturing the layered product according to claim 7, wherein a film thickness of the second layer is 0.5 µm or greater and 20 µm or less.

12. The method of manufacturing the layered product according to claim 7, wherein 1 to 20 mass % of carbon nanotubes are contained in a material constituting the first layer.

13. The layered product according to claim 1, wherein the black pigment contained in the first layer includes at least one of carbon black or carbon nanotubes.

* * * * *